Figure 1:
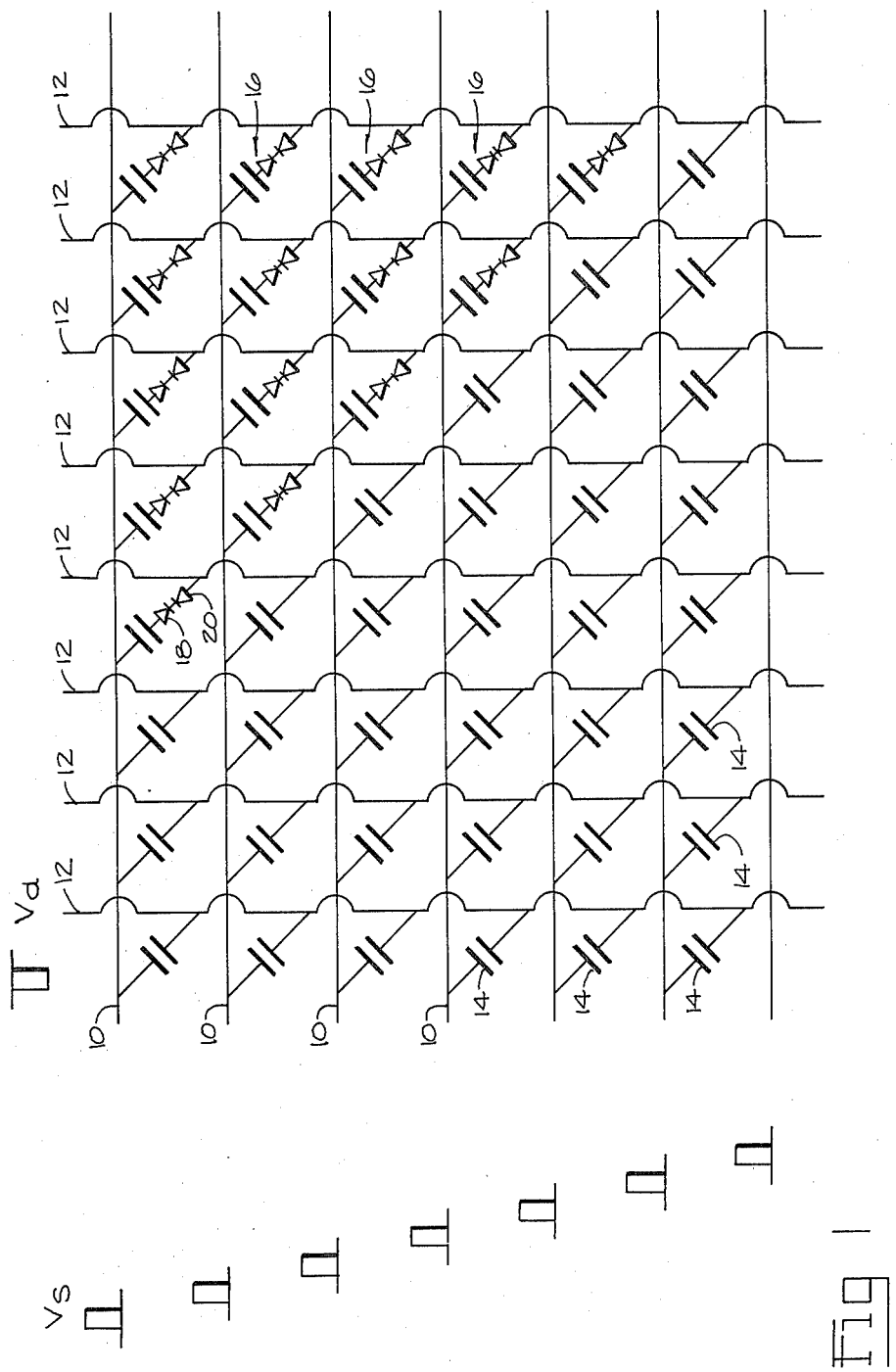

United States Patent [19]
Baraff et al.

[11] 4,223,308
[45] Sep. 16, 1980

[54] LCDS (LIQUID CRYSTAL DISPLAYS) CONTROLLED BY THIN FILM DIODE SWITCHES

[75] Inventors: David R. Baraff, Ottawa; Nur M. Serinken, Kanata; Carla J. Miner, Nepean; Richard W. Streater, Ottawa; Vladimir F. Drobny, Ottawa, all of Canada

[73] Assignee: Northern Telecom Limited, Montreal, Canada

[21] Appl. No.: 60,290

[22] Filed: Jul. 25, 1979

[51] Int. Cl.³ .................................................. G09F 9/35
[52] U.S. Cl. ..................................... 340/719; 307/256; 340/784; 340/785; 340/811; 350/334; 357/32
[58] Field of Search ....................... 340/784, 785, 719; 357/32; 307/256; 350/334

[56] References Cited
U.S. PATENT DOCUMENTS

| | | | |
|---|---|---|---|
| 4,028,692 | 6/1977 | Ngo .................................. | 340/784 |
| 4,062,626 | 12/1977 | Kawakami et al. ............. | 340/784 X |
| 4,103,297 | 7/1978 | McGreivy et al. ................. | 340/719 |
| 4,114,070 | 9/1978 | Asars ................................ | 340/719 X |
| 4,129,861 | 12/1978 | Giglia ............................... | 340/785 X |

Primary Examiner—David L. Trafton
Attorney, Agent, or Firm—Sidney T. Jelly

[57] ABSTRACT

A matrix multiplexed display cell has thin film switch devices at matrix crosspoints to provide a turn-on threshold for the electro-optic liquid used in the cell. Each of the switch devices is a back-to-back pair of diodes. The cell is operated at low current so that the switch devices, which are deposited on glass, do not degrade rapidly in use.

19 Claims, 2 Drawing Figures

LCDS (LIQUID CRYSTAL DISPLAYS) CONTROLLED BY THIN FILM DIODE SWITCHES

This invention relates to display cells utilizing electro-optic liquid, specifically to such display cells matrix multiplexed to a high level. Although the invention is described primarily in conjunction with a liquid crystal (LC) cell which represents its chief intended application, it will be appreciated that it can be used to advantage with display cells using alternative electro-optic materials, specifically cells based on electropheretic or electrochromic liquids.

In a matrix multiplexed addressing scheme for a LC display cell, a series of scan pulses, $V_s$, is, for example, applied sequentially to each of a series of row conductors, (scan lines), while a series of data pulses, $V_d$, is applied to selected ones of a series of column conductors, (data lines). To turn on a LC picture element, (pel), at a selected row and column intersection, the difference between $V_s$ and $V_d$ applied to the selected row and column respectively, is made great enough to alter the LC molecular orientation, and thus the cell optical transmissivity, in a manner known in the art.

Several factors combine to limit the number of lines that can be multiplexed in a LC display cell.

Firstly, at the instant at which a pel is selected, other, non-selected pels in the selected column also experience a pulse $V_d$. For one address period, the RMS value of a.c. voltage experienced by these pels is insufficient to turn them on, but if N pels in a column are switched on and off in a single field scan, an off pel wil experience $V_d$ for N address periods. This may be enough to turn the pel on. It can be shown that the ratio of RMS voltage seen by an on pel to that seen by an off pel is:

$$\frac{V^{ON}_{RMS}}{V^{OFF}_{RMS}} = \sqrt{\frac{(V_s + V_d)^2 + V_d^2(N-1)}{(V_s - V_d)^2 - V_d^2(N-1)}}$$

As N increases, the ratio becomes smaller and, since liquid crystals do not have a sharp threshold separating on and off, the contrast ratio between on and off pels becomes poorer. At a certain number of row conductors, the contrast ratio becomes unacceptable.

The problem is compounded as the angle from which the cell is viewed deviates from an optimum value. Also, since the LC electro-optic response is temperature dependent, then if the LC is to be off at $V_{off}$ at high temperature, and on at $V_{on}$ at low temperature, the difference between $V_{off}$ and $V_{on}$ must be greater than for constant temperature operation.

For the above reasons, prior art limits multiplexing to about 4 lines (or 8 lines for temperature compensated display cells).

A suggestion for solving this problem proposes placing a switch in series with each pel at the intersections of the scan and data lines, such that pulses $V_d$ do not activate the switch nor the pel controlled by it whereas a selection pulse $V_s+V_d$ does activate the switch whereupon the LC or other electro-optic material experiences voltage. Such a switch should be symmetrical with respect to zero voltage since, for the purpose of preventing irreversible electro-chemical degradation of the LC, net d.c. bias should be avoided.

In its broadest aspect, the invention proposes the use of a pair of back-to-back, thin film diodes as the switch. In operation, when the voltage on the switch is less than the breakdown point of the reverse-biased diode of the pair, only the saturation or sub-breakdown current is passed with most of the voltage drop being across the reverse-biased diode. When the voltage on the switch is greater than breakdown, the reverse-biased diode conducts as much as 8 orders of magnitude more current than in the "off" state, the limit being imposed by heat dissipation and damage to the diode. This turn-on is sufficiently sharp to increase the number of multiplexed lines compared to the number permitted when no switch is used by at least a factor of 10. If, on the other hand, the number of multiplexed lines is maintained, then using thin film diode switches of this type provides a greatly increased viewing angle, contrast ratio and permitted temperature range.

Thin film diodes used in this application may be of known structure. Certain examples of homojunctions, heterostructures, metal-semiconductor junctions and metal-insulator-semiconductor devices all have demonstrably sharp enough turn-on thresholds for use in LC display matrix crosspoints.

Figure 2:
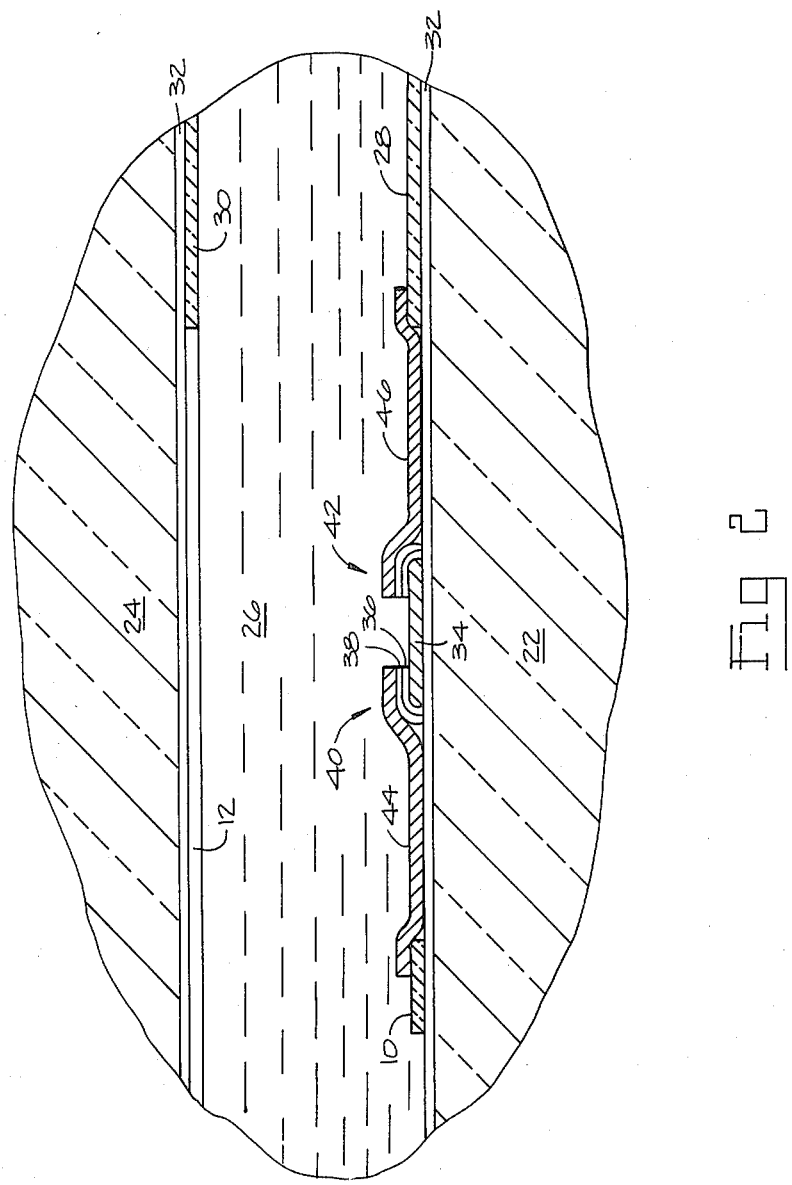

Embodiments of the invention will now be described by way of example with reference to the accompanying drawings, in which:

FIG. 1 shows, in schematic form, a matrix multiplexed addressing scheme for a LC display; and FIG. 2 is a sectional view (not to scale) showing part of a liquid crystal display cell using one form of thin film back-to-back diode switch.

In a conventional matrix multiplexed addressing scheme for a LC display cell, as shown at bottom left in FIG. 1, a series of scan pulses $V_s$ is, in use, applied sequentially to each row of a series of row conductors 10, called scan lines, while a series of data pulses $V_d$ is applied to selected ones of a series of column conductors 12, called data lines. If an "on" pulse is desired at a LC pel 14 at a selected row and column intersection, the difference between $V_s$ and $V_d$ applied to the selected row and column respectively is made great enough to turn on the LC pel in a manner known in the art.

As previously explained, since LC's do not have a sharp threshold separating on and off, then a pel may turn on even though not specifically addressed because it experiences data pulses $V_d$ driving other pels in the same column.

As shown at top right in FIG. 1, the invention proposes the formation of thin film switches 16 in series with each LC pel 14, each switch having a pair of series-connected back-to-back diodes, 18, 20.

Referring to FIG. 2, the liquid crystal cell comprises a pair of glass plates 22, 24 with a layer of twisted nematic LC 26 sealed between them. The inner surfaces of the plates 22, 24 are treated in a manner known in the art so as to properly orientate the LC molecules. As is well known, by applying a voltage across selected regions of the LC layer 26, the LC can be caused to undergo localized molecular reorientation with consequent alteration in optical transmissivity of the cell.

A switch 16 is sited adjacent the position of each pel 14, the pels being defined by a row-column array of transparent electrodes 28 on the inside surface of plate 22 and by a corresponding array of transparent electrodes 30 on the inside surface of plate 24. Although not illustrated, switches can be series-connected to one or both electrodes of each pel, the pels thus having an associated thin film fabricated switch device on either or both of the plates 22 and 24. In another alternative, a pair of back-to-back diodes controlling a pel can, in fact be split by the pel, one diode connected to an electrode 28, and the other to an electrode 30. The benefit of this structure is that the two plates 22 and 24 are identical and manufacture is consequently cheaper and easier.

In one embodiment, to obtain hydrogenated amorpous silicon diodes of the homojunction type, the glass plates are first cleaned ultrasonically in soap and water, rinsed in de-ionized water and dried in isopropyl alcohol vapour. An etch protectant 32 is then deposited onto the inner surfaces of the glass plates. A vapour-deposited nickel layer subsequently formed on plate 22 is photodefined into row conductors 10 and bottom ohmic contact regions 34. Two layers 36, 38 of amorphous silicon having predetermined, and different, dopant levels are next deposited by glow discharge decomposition of silane with an appropriate dopant gas. An n-type layer is made using phosphine ($PH_3$) dopant gas and p-type layer is made using diborane ($B_2H_6$) dopant gas. The layers are photodefined into spaced pads, 40, 42, each pad partially covering one of the contact regions 34. Ohmic conductors 44, are thin film deposited on pads 40 of each switch. Detailed fabrication steps are described by Spear and LeComber in Philosophical Magazine, 1976, Vol. 33, No. 6, pp 935-949. Each conductor 44 extends to, and overlies, a row conductor 10, each row conductor 10 connecting one pole from all the switches in that row to drive circuitry (not shown). Ohmic conductors 46 are thin film deposited on pads 42 of each switch, each conductor 46 extending to and overlying a respective transparent pel electrode 28.

In operation, the diodes 18, 20 of each switch are alternately reverse-biased since, for the purpose of preventing irreversible electro-chemical degradation of the LC 26 net d.c. bias is avoided. Thus when, say, switch 18 is reverse-biased and the voltage on it is below the breakdown point, only the saturation current is passed with most of the voltage drop occurring across diode 18. When the switch voltage is increased above breakdown, the diode 18 conducts as much as 8 orders of magnitude more current than in the "off" state, the limit being imposed by heat dissipation and damage to the diodes.

The electrodes 30 common to a particular column on the glass plate 24 are electrically connected by thin film connecting leads 12 which enable pulses to be selectively applied to LC pels 14 by applying data and scanning pulses, $V_d$ and $V_s$, to the appropriate conductors 10 and 12.

To fabricate the cell, inner surfaces of the glass plates 22, 24 are then coated with organic polymer which is undirectionally rubbed to ensure LC alignment. The plates are assembled into a 90° twist cell of 12 $\mu$m spacing which is filled with BDH E-7 cyano biphenyl-terphenyl mixture having a resistivity of $2 \times 10^{10}$ ohm cm to give a twisted nematic LC layer 26.

If desired, the diode structure can be reversed, the conductors 44 and 46 being deposited before formation of the homojunctions and the common contact area 34 being thin film deposited subsequently.

One of the advantages of using thin film technology is that conducting regions can be sputtered or vacuum deposited with a thickness such that they are substantially transparent. Depending on the order of fabrication, the pel electrodes 28, 30 can be formed as regions of, for example, 10 ÅNiCr, −10ÅAu simultaneously with the formation of one or more of the regions 10, 12, 34, 55 and 46.

A second suitable class of diode structures are heterojunctions of which one embodiment is a $CdS-Cu_2S$ diode. Such diodes are formed by vacuum deposition of a 2500 Å thin film of CdS followed by a film of CuCl. The structures are converted to heterojunctions by heating to 100°-200° C. for a short period of time. Ohmic bottom and top contacts are provided as described for the first embodiment. Detailed fabrications steps are described by Das et al in Thin Solid Film, Vol. 51 pp. 257-264, 1978.

A third suitable class of diode structures are metal-semiconductor junctions, one embodiment of which is fabricated by firstly depositing CdSe on a configuration of ohmic bottom contact regions as described for the first embodiment. This may be annealed in air to reduce resistivity. Gold blocking contact regions are deposited over the semiconductor regions as described for the first embodiment.

A fourth suitable class of diode structures are metal-insulator-semiconductor devices which are similar to the third class of devices except that an insulator layer is deposited between the metal and the semiconductor which has the advantage of minimizing capacitance which would otherwise reduce the effectiveness of the switch. In one embodiment $Al_2O_3$ insulator is formed by vacuum depositing Al at slight $O_2$ pressure. In an alternative embodiment, the insulator layer is vacuum deposited CdTe. Detailed fabrication steps are described by Muller and Zuleeg in Journal of Appl. Phys. Vol. 35, No. 5, 1964.

The important characteristics of the back-to-back diode switches are that they should be prepared as thin film devices and should function as switches. The particular thin film techniques (sputtering, vacuum evaporation, anodization, etc.) used in the formation of the back-to-back diode layers is chosen to be compatible with the material being formed and the glass substrate material.

Using switches at matrix crosspoints, high level multiplexing (=10 lines) of a matrix addressed array of liquid crystal display picture elements can be obtained without the prior art problems of narrow viewing angle, low contrast ratio between off and on elements, and greatly limited operating temperature ranges. The back-to-back diode switches may be used both in transmissive and reflective displays depending on the character of the plates 22 and 24 and the electro-optic liquid used.

Since the thin film switches are very much less than 10 microns in thickness, i.e. at most, 1 micron, their presence on the transparent plates flanking the LC material does not prevent the use of a correspondingly thin layer of LC material as would thick film devices. In turn, and assuming the resistance of the LC material is very high, of the order of $10^{10}$ ohm cm., then charge through the switches is limited by the LC. Coupled with the fact that such switches show their threshold switching characteristics at a very low current, of the order of na-$\mu$a, it will be appreciated that the back-to-back diode switches can be operated in a very low current regime which reduces the chance of their failing through excess heat dissipation. In the intended application to a large area (e.g. 9"×9") high pel density (e.g. pel area of less than 25 mil sq. display), fabrication of the thin film diode devices offers significant cost benefits over thin film transistor switches since fabrication techniques for the latter are more complex and are characterized by poor yield. In addition, the fabrication techniques proposed are vastly preferred to silicon IC techniques, again because of cost and, further, because by using known techniques, accurately planar glass surfaces can be achieved which ensure little variation in LC cell thickness.

Although the embodiment described uses a twisted nematic LC, other examples may be used. For example, a cholesteric LC operated in a scattering mode is particularly applicable to a reflective display. As indicated previously, other electro-optic materials, for example, electropheretic and electrochromic materials may also be used.

What is claimed is:

1. A display cell comprising a pair of plates flanking an electro-optic material, the optical transmissivity of the electro-optic material being dependent on potential difference applied across the material, at least one of the plates being transparent, the display cell having a plurality of picture elements, each picture element defined by a pair of opposed thin film electrodes on the inside faces of the respective plates, thin film conducting means on said plates for applying a voltage between the opposed electrodes of each element, and a plurality of switch elements series connected to and controlling respective picture elements, the switch elements each comprising a pair of back-to-back, series-connected, thin film diodes.

2. A display cell as claimed in claim 1, in which the pair of diodes of each switch flank the picture element controlled thereby, one diode formed on one plate and connected to one electrode of the picture element, the other diode formed on the other plate and connected to the other electrode of the picture element.

3. A display cell as claimed in claim 1, the picture elements and said switch elements being arranged in rows and columns with said switch elements formed on one of the plates, first lead means electrically connecting one pole of each switch element to its series connected picture element, second lead means electrically connecting the other poles of the switch elements in rows, and third lead means electrically connecting the electrodes on the other plate in columns.

4. A display cell as claimed in claim 3, in which the electrodes are thin film formed integrally with the lead means connected thereto.

5. A display cell as claimed in claim 3, the diodes having top and bottom contact layers, the bottom contact layers and the electrodes on said one plate being formed simultaneously as a substantially transparent layer.

6. A display cell as claimed in claim 1, in which the diodes are homojunctions.

7. A display cell as claimed in claim 6, in which said diodes are hydrogenated amorphous silicon homojunctions.

8. A display cell as claimed in claim 1, in which the diodes are heterojunctions.

9. A display cell as claimed in claim 8, in which said diodes are $CdS$-$Cu_2S$ heterojunctions.

10. A display cell as claimed in claim 1, in which the diodes are metal-semiconductor junctions.

11. A display cell as claimed in claim 10, in which said diodes have a gold CdSe junction.

12. A display cell as claimed in claim 1, in which the diodes are metal-insulator-semiconductor devices.

13. A display cell as claimed in claim 12, in which said insulator is $Al_2O_3$.

14. A display cell as claimed in claim 12, in which said insulator is CdTe.

15. A display cell as claimed in claim 1 in which said electro-optic material is a liquid crystal.

16. A display cell as claimed in claim 1 in which said electro-optic material is an electrochromic material.

17. A display cell as claimed in claim 1, in which said electro-optic material is an electrophoretic material.

18. A display cell as claimed in claim 1 in which one of said plates is transparent and the other plate is reflecting.

19. A display cell as claimed in claim 1 in which both of the plates are transparent.

* * * * *